United States Patent [19]

Kato

[11] 4,451,549

[45] May 29, 1984

[54] LAMINATED PHOTOSENSITIVE PLATE FOR ELECTROPHOTOGRAPHY AND PROCESS FOR PREPARATION THEREOF

[75] Inventor: Yoshiaki Kato, Hirakata, Japan

[73] Assignee: Mita Industrial Co., Ltd., Osaka, Japan

[21] Appl. No.: 454,675

[22] Filed: Dec. 30, 1982

Related U.S. Application Data

[63] Continuation of Ser. No. 233,688, Feb. 12, 1981, abandoned.

[30] Foreign Application Priority Data

Feb. 13, 1980 [JP] Japan .................................. 55-15515

[51] Int. Cl.$^3$ .............................................. G03G 5/06
[52] U.S. Cl. ..................................... 430/134; 430/58; 430/57; 430/127
[58] Field of Search ................... 430/134, 57, 58, 133, 430/127

[56] References Cited

U.S. PATENT DOCUMENTS

| | | | |
|---|---|---|---|
| 3,745,005 | 7/1973 | Yoerger et al. | 430/64 X |
| 3,850,630 | 11/1974 | Regensburger | 430/58 |
| 3,880,656 | 4/1975 | Nagashima et al. | 430/97 X |
| 4,106,934 | 8/1978 | Turnblom | 430/58 |
| 4,264,695 | 4/1981 | Kozima et al. | 430/58 |

*Primary Examiner*—John D. Welsh
*Attorney, Agent, or Firm*—Sherman & Shalloway

[57] ABSTRACT

Disclosed is a laminated photosensitive plate for electrophotography, which comprises a conductive substrate, a layer capable of forming a movable carrier by absorption of light, which is formed on the substrate, and a positive hole-moving layer formed on the movable carrier-generating layer, wherein the movable carrier-generating layer is comprised of a matrix comprising a vinyl pyrrolidone type polymer and an electron-receptive substance and a photoconductive organic pigment dispersed in the matrix.

This laminated photosensitive plate is excellent in the sensitivity, initial saturation voltage, smoothness and mechanical strength.

5 Claims, 1 Drawing Figure

LAMINATED PHOTOSENSITIVE PLATE FOR ELECTROPHOTOGRAPHY AND PROCESS FOR PREPARATION THEREOF

This is a continuation of application Ser. No. 233,688, filed Feb. 12, 1981, abandoned.

BACKGROUND OF THE INVENTION

(1) Field of the Invention

The present invention relates to a laminated photosensitive plate for electrophotography and a process for the preparation thereof. More particularly, the present invention relates to a laminated photosensitive plate for electrophotography which is excellent in the sensitivity, initial potential, smoothness and mechanical strength and a process for the preparation thereof. Furthermore, the present invention relates to a process in which the abovementioned excellent laminated photosensitive plate can be prepared very simply at a high operation efficiency.

(2) Description of the Prior Art

As the known conventional photosensitive plate for electrophotography, there can be mentioned a laminated photosensitive plate comprising a conductive substrate, a layer capable of generating a movable carrier by absorption of light, which is formed on the substrate, and a positive hole-moving layer formed on the movable carrier-generating layer. It is known that a dispersion of an inorganic or organic photoconductive pigment in an electrically insulating resin binder is used for formation of the movable carrier-generating layer. Furthermore, it is known that an electron-donative polymer such as polyvinylcarbazole is used for formation of the positive hole-moving layer. When a laminated photosensitive plate of this type is charged with a negative polarity and is then subjected to imagewise exposure, a movable carrier consisting of a positive hole and an electron is generated on the movable carrier-generating layer in the exposed area. This positive hole is injected into the positive hole-moving layer to neutralize the surface negative charge, while the electron in the movable carrier-generating layer is grounded through the conductive substrate, whereby an electrostatic latent image is formed.

In preparing this laminated photosensitive plate, an electrically insulating binder is dissolved in an appropriate organic solvent and a photoconductive pigment is dispersed in the solution to form a coating composition, and the coating composition is coated on the surface of a conductive substrate to form a movable carrier-generating layer and a solution of an electron-donative polymer in an organic solvent is coated on this movable carrier-generating layer to form a positive hole moving layer. Ordinarily, an electron-donative polymer is soluble only in a solvent having a high dissolving power, such as tetrahydrofuran, and when a solution of the electron-donative polymer in such solvent is coated on the movable carrier-generating layer, re-dissolution of the electrically insulating binder in the movable carrier-generating layer is caused and the sensitivity or initial saturation voltage of the resulting laminated photosensitive plate is considerably reduced. It has been found that this tendency is especially prominent when a photoconductive organic pigment is incorporated in the movable carrier-generating layer and an electron-receptive substance is further incorporated in order to increase the sensitivity. Furthermore, in the case where re-dissolution of the movable carrier-generating layer is caused, the smoothness or mechanical strength of the photosensitive plate tends to degrade.

BRIEF SUMMARY OF THE INVENTION

We found that the foregoing defects of the conventional laminated photosensitive plates can effectively be eliminated if a vinyl pyrrolidone type polymer is selected and used as a resin binder in which a photoconductive organic pigment and an electron-receptive substance are to be incorporated and this coating composition is used for formation of a movable carrier-generating layer.

It is therefore a primary object of the present invention to provide a laminated photosensitive plate for electrophotography, which is excellent in the sensitivity, initial saturation voltage, smoothness and mechanical strength.

Another object of the present invention is to provide a laminated photosensitive plate for electrophotography comprising a conductive substrate, a movable carrier-generating layer and a positive hole-moving layer, in which in the boundary between the movable carrier-generating layer and the positive hole-moving layer, the polymers of both the layers are not substantially dissolved in each other.

Still another object of the present invention is to provide a process in which a resin binder of a movable carrier-generating layer acts as a barrier to a solvent of a coating composition to be used for formation of a positive hole-moving layer, with the result that a photosensitive plate for electrophotography excellent in the sensitivity, smoothness and mechanical strength can be obtained at a high operation efficiency.

In accordance with one fundamental aspect of the present invention, there is provided a laminated photosensitive plate for electrophotography, which comprises a conductive substrate, a layer capable of forming a movable carrier by absorption of light, which is formed on the substrate, and a positive hole-moving layer formed on the movable carrier-generating layer, wherein said movable carrier-generating layer is comprised of a matrix comprising a vinyl pyrrolidone type polymer and an electron-receptive substance and a photoconductive organic pigment dispersed in said matrix.

In accordance with another fundamental aspect of the present invention, there is provided a process for the preparation of laminated photosensitive plates for electrophotography, which comprises coating on a conductive substrate a coating composition formed by dissolving a vinyl pyrrolidone type polymer and an electron-receptive substance in a halogenated aliphatic hydrocarbon solvent and dispersing a photoconductive organic pigment in the solution, drying the coated composition to form a layer comprised of a matrix comprising the vinyl pyrrolidone type polymer and the electron-receptive substance and the photoconductive organic pigment dispersed in the matrix, coating on the so-formed layer a solution of an electron-donative polymer in a solvent selected from the group consisting of cyclic ethers, halogenated aromatic hydrocarbons and aromatic hydrocarbon/ketone mixed solvents, and drying the coating solution to form a layer of the electron-donative polymer.

The present invention will now be described in detail.

Figure 1:
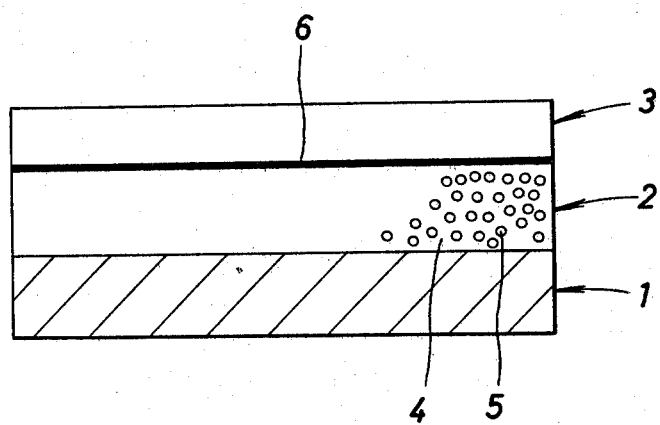
FIG. 1 is a schematic sectional diagram illustrating the structure of the laminated photosensitive plate according to the present invention.

In the drawings, reference numerals 1, 2, 3, 4 and 5 represent a conductive substrate, a movable carrier-generating layer, a positive hole-moving layer, a matrix and pigment particles, respectively.

DETAILED DESCRIPTION OF THE PREFERRED EMBODIMENTS

The basic structure of the laminated photosensitive plate of the present invention is illustrated in FIG. 1. Referring to FIG. 1, the laminated photosensitive plate of the present invention comprises a conductive substrate 1, a movable carrier-generating layer 2 formed on the substrate 1 and a positive hole-moving layer 3 formed on the layer 2. The positive hole-moving layer 3 is composed mainly of an electron-donative polymer, while the movable carrier-generating layer 2 is comprised of a matrix 4 comprising a vinyl pyrrolidone type polymer and an electron-receptive substance and particles 5 of a photoconductive organic pigment dispersed in the matrix. In the boundary region 6 between the movable carrier-generating layer 2 and the positive hole-moving layer 3, though it is natural that the layer 3 should be comprised of the electron-donative polymer and the layer 2 should contain the electron-receptive substance and that there should be formed a thin layer of a charge-transferring complex of the two substances, it must be noted that in this boundary region, mutual dissolution or mingling of the electron-donative polymer and vinyl pyrrolidone type polymer is not substantially caused.

One of the important features of the present invention is that a vinyl pyrrolidone polymer is selected and used as the resin binder for formation of the matrix of the movable carrier-generating layer 2. The vinyl pyrrolidone polymer is known as a water-soluble polymer, and this polymer is characteristic over other thermoplastic resin binders in that the polymer is soluble in halogenated hydrocarbons capable of dissolving therein many electron-receptive substances, such as methylene chloride, but it is substantially insoluble in cyclic ethers capable of dissolving therein electron-donative polymers, such as tetrahydrofuran.

By virtue of this characteristic property of the vinyl pyrrolidone polymer, when a movable carrier-generating layer 2 is formed on a conductive substrate 1 by using a composition prepared by dissolving this vinyl pyrrolidone polymer and an electron-receptive substance in a halogenated hydrocarbon solvent and dispersing a photoconductive organic pigment in the solution and a positive hole-moving layer 3 is then formed on the movable carrier-generating layer 2 by using a solution formed by dissolving an electron-donative polymer in a cyclic ether, the vinyl pyrrolidone polymer acts as a barrier to the cyclic ether solvent and re-dissolution of the formed movable carrier-generating layer 2 is prevented, and furthermore, mutual dissolution or mingling of both the polymers in the boundary region between the two layers is effectively prevented, with the result that the sensitivity and initial saturation voltage are remarkably increased and the smoothness and mechanical strength are improved.

These excellent effects can be attained only when the vinyl pyrrolidone type polymer is used according to the present invention. Even if electrically insulating resin binders customarily used, such as polyesters, polycarbonates, polystyrene, acrylic resins and epoxy resins, are used as binders for the movable carrier-generating layer, such effects cannot be attained at all, as illustrated in Comparative Examples given hereinafter. Furthermore, even when water-soluble resin binders such as polyvinyl alcohol, methyl cellulose and carboxymethyl cellulose are used, such excellent effects cannot be attained at all.

A polymer comprised mainly of vinyl pyrrolidone units, that is, units represented by the following formula:

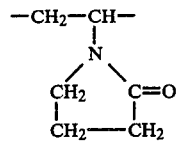

is used as the vinyl pyrrolidone type polymer in the present invention. A homopolymer of vinyl pyrrolidone is most preferred, but copolymers of vinyl pyrrolidone with other copolymerizable ethylenically unsaturated monomers may be used in the present invention, so far as they are soluble in halogenated hydrocarbon solvents such as methylene chloride but substantially insoluble in cyclic ethers such as tetrahydrofuran. As such monomer, there can be mentioned, for example, hydrocarbon monomers such as styrene, vinyltoluene, α-methylstyrene, ethylene and butadiene; ethylenically unsaturated carboxylic acids such as acrylic acid, methacrylic acid, maleic anhydride and crotonic acid; ethylenically unsaturated carboxylic acid esters such as ethyl acrylate, butyl acrylate, octyl acrylate and methyl methacrylate; unsaturated nitriles such as acrylonitrile and methacrylonitrile; unsaturated carboxylic acid amides such as acrylamide and methacrylamide; vinyl esters such as vinyl acetate; and halogenated hydrocarbon monomers such as vinyl chloride, vinylidene chloride and vinyl fluoride. These monomers may be used singly or in the form of a mixture of two or more of them. It is ordinarily preferred that the vinyl pyrrolidone units should occupy at least 60 mole %, especially at least 80 mole %, of the total monomer units of the copolymer.

The molecular weight of the vinyl pyrrolidone type polymer has a considerably close relation to the solubility characteristics to the above-mentioned solvents. It is ordinarily preferred that the average molecular weight, as determined according to the osmotic pressure method, of the vinyl pyrrolidone polymer be at least 100,000 and especially in the range of from 150,000 to 500,000.

All of photoconductive organic pigments customarily used in the field of photosensitive plates for electrophotography can be used as the photoconductive organic pigment in the present invention. For formation of the movable carrier-generating layer, in the present invention, there are preferably used phthalocyanine type pigments such as β-type metal-free phthalocyanine (C.I. 74100), bisbenzoimidazole type pigments such as perinone (C.I. 71105), indigo type pigments such as thioindigo (C.I. 73,360), azo pigments such as Dian Blue (C.I. 21180), perylene type pigments such as N,N'-di(3,5-dimethylphenyl)-perylene-3,4,9,10-tetracarboxylic acid diimide, N,N'-di(4-chlorophenyl)-perylene-3,4,9,10-tetracarboxylic acid diimide, N,N'-di(benzyl)- perylene-3,4,9,10-tetracarboxylic acid diimide, N,N'-diphenylperylene-3,4,9,10-tetracarboxylic acid dihydrazide and N,N'-dipyridinylperylene-3,4,9,10-tetracarboxylic acid diimide, and quinacridone pigments represented by the following formula:

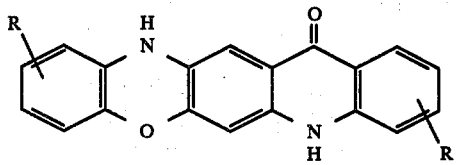

wherein R stands for a hydrogen atom or halogen atom, such as a quinacridone pigment having a color index number of C.I. 46500.

These photoconductive organic pigments may be used singly or in the form of a mixture of two or more of them.

Among electron-receptive substances customarily used for photosensitive plates for electrophotography, organic compounds soluble in halogenated aliphatic hydrocarbons are selected and used as the electron-receptive substance in the present invention. Among these organic compounds, 2,4,7-trinitro-9-fluorenone, chloranil, 2,3-dichloro-1,4-naphthoquinone, 2,5-dichloro-p-benzoquinone, 1,5-dichloroanthraquinone and tetracyanoquinodimethane are especially preferred.

In the movable carrier-generating layer of the photosensitive plate of the present invention, it is preferred that the vinyl pyrrolidone type polymer be used in an amount of 0.1 to 10 parts by weight, especially 0.2 to 5 parts by weight, per part by weight of the photoconductive organic pigment and the electron-receptive substance be used in an amount of 0.01 to 10 parts by weight, especially 0.5 to 4 parts by weight, per part by weight of the photoconductive organic pigment. If the amount of the vinyl pyrrolidone polymer is too small, it is difficult to form a uniform and homogeneous movable carrier-generating layer by the coating operation. If the amount of the vinyl pyrrolidone type polymer is too large, reduction of the sensitivity is observed. If the amount of the electron-receptive substance is too small, the sensitivity is lowered, and if the amount of the electron-receptive substance is too large, uniform dissolution of the electron-receptive substance in the movable carrier-generating layer becomes difficult, with the result that the electrophotographic characteristics of the resulting photosensitive plate become uneven.

According to the present invention, the vinyl pyrrolidone type polymer and the electron-receptive substance are dissolved in a halogenated aliphatic hydrocarbon solvent, the photoconductive organic pigment is dispersed in the solution to form a coating composition, and the coating composition is coated and dried on a conductive substrate to form a movable carrier-generating layer such as mentioned above.

As the halogenated aliphatic hydrocarbon, there are preferably used aliphatic hydrocarbons having a group —CHX$_2$ in which X stands for a halogen atom, especially methylene dichloride, chloroform and ethylene dichloride. Furthermore, there can be used dichloromonofluoromethane and chlorodifluoromethane.

It is ordinarily preferred that the coating composition be applied at a solid component concentration of 3 to 15% by weight.

As the conductive substrate, there can be used foils and sheets of metals such as aluminum, copper and tinplate, papers which have been subjected to an electric conductive treatment, and plastic films and glass sheets on which metals are deposited by sputtering, vacuum evaporation deposition, non-electrode plating or the like. These conductive substrates may be used in the form of a sheet or drum.

The coating composition is applied to the conductive substrate so that the thickness of the coating in the dry state is 0.1 to 50$\mu$, especially 1 to 20$\mu$.

Polymers composed mainly of units of a fused polycyclic vinyl compound, which are soluble in cyclic ethers such as tetrahydrofuran, are used as the electron-donative polymer constituting the positive hole-moving layer in the present invention. As typical instances of such polymer, there can be mentioned poly-N-vinylcarbazole, poly-3-vinyl-N-ethylcarbazole, poly-N-vinyl-2,6-dibromocarbazole, polyphenylene-pyrazole, poly-1-allyl-4,5-diphenylimidazole, polyvinylpyrene, polyvinylphenanthrene, polyacenaphthylene, polyvinyldibenzothiophene, poly-1-vinylacridine, poly-N-allylphenothiazine and polyvinylanthrathene. Among these polymers, a polymer of N-vinylcarbazole or its derivative is especially preferred.

Cyclic ethers such as tetrahydrofuran are preferably used as the solvent for dissolving the above-mentioned electron-donative polymer. Furthermore, halogenated aromatic hydrocarbons such as monochlorobenzene and aromatic hydrocarbon/ketone mixed solvents such as toluene/cyclohexanone can be used. The solution of the electron-donative polymer is ordinarily applied to the above-mentioned movable carrier-generating layer at a solid concentration of 3 to 15% by weight and is then dried to form a positive hole-moving layer.

In the present invention, since the vinyl pyrrolidone type polymer constituting the matrix of the movable carrier-generating layer is substantially insoluble in the above-mentioned cyclic ethers, halogenated aromatic hydrocarbons and aromatic hydrocarbon/ketone mixed solutions, mutual dissolution or mingling of the vinyl pyrrolidone type polymer and the electron-donative polymer is effectively prevented in the boundary region between the movable carrier-generating layer and the positive hole-moving layer, with the result that the sensitivity and initial saturation voltage are remarkably improved. Since the electron-receptive substance in the movable carrier-generating layer is ordinarily soluble in the solvents to be used for formation of the positive hole-moving layer, a charge-transferring complex is formed from the electron-donative polymer and this electron-receptive substance in the boundary region between the two layers. It is believed that the improvement of the sensitivity is further enhanced by formation of such complex.

Since this positive hole-moving layer is located in the surface portion of the photosensitive plate, it is preferred to improve the abrasion resistance, scratch resistance, peel resistance and other mechanical strength characteristics of this layer. For this purpose, a reinforcing polymer such as a polyester resin, a polycarbonate resin, an epoxy resin, polystylene or an acrylic resin may be incorporated into the positive hole-moving layer in an amount of 5 to 40% by weight, especially 10 to 30% by weight, based on the electron-donative polymer.

It is preferred that the dry thickness of the positive hole-moving layer be 0.1 to 100$\mu$, especially 1 to 30$\mu$.

The present invention will now be described in detail with reference to the following Examples that by no means limit the scope of the invention.

EXAMPLE 1

In 60 g of methylene chloride were dissolved 1 g of a polyvinyl pyrrolidone resin (PVP K-90 manufactured and supplied by GAF Co.) and 2 g of 2,4,7-trinitrofluorenone, and 1 g of a perinone type pigment (Hostaperm Orange GR manufactured and supplied by Hoechst AG, C.I. 71105) was added to the solution and the mixture was dispersed by an ultrasonic disperser for 2 minutes. The dispersion was coated on a rigid aluminum sheet having a thickness of 50μ by a wire doctor blade and then dried at 100° C. for 2 minutes to form a movable carrier-generating layer having a thickness of 6μ.

A positive hole-moving layer-forming solution prepared by dissolving 8 g of polyvinylcarbazole (Luvican M-170 manufactured and supplied by BASF) and 1 g of a polycarbonate resin (Panlite K manufactured and supplied by Teijin Limited) in 140 g of tetrahydrofuran was coated on the so formed movable carrier-generating layer by a wire doctor blade and then dried at 100° C. for 30 minutes to form a positive hole-moving layer having a thickness of 5μ. When the positive hole-moving layer-forming solution was coated on the movable carrier-generating layer, the movable carrier-generating layer was not dissolved by tetrahydrofuran of the positive hole-moving layer-forming solution, and therefore, a uniform laminated photosensitive plate for electrophotography was obtained. This photosensitive plate was rich in the flexibility and crazing or curling was hardly caused.

The charging characteristics of the so obtained photosensitive plate were determined by using an electrostatic copying paper tester (Model SP-428 supplied by Kawaguchi Denki K. K.) according to the following procedures. The plate was negatively charged at −6 KV by corona discharge and was illuminated by a tungsten lamp so that the surface illuminance was 20 luxes, and the half-value exposure quantity was measured. It was found that the maximum surface potential was −570 V and the half-value exposure quantity was 9 lux-second.

When the photosensitive plate was subjected to corona discharge, imagewise exposure, development, transfer and fixation according to the known electrophotographic process, there was obtained an image faithful to an original, in which the background was not contaminated at all.

COMPARATIVE EXAMPLE 1

For comparison, 1 g of a polyester resin (Adhesive 49000 manufactured and supplied by Du Pont) and 2 g of 2,4,7-trinitrofluorenone were dissolved in 30 g of tetrahydrofuran, and 1 g of a perinone pigment (Hostaperm Orange GR manufactured and supplied by Hoechst AG, C.I. 71105) was added to the solution and the mixture was dispersed by an ultrasonic disperser for 2 minutes. The dispersion was coated on a rigid aluminum sheet having a thickness of 50μ by using a wire doctor blade and was then dried at 100° C. for 2 minutes to form a movable carrier-generating layer having a thickness of 8μ. The same positive hole-moving layer-forming solution as used in Example 1 was coated on the so formed movable carrier-generating layer by a wire doctor blade and dried at 100° C. for 30 minutes to form a positive hole-moving layer having a thickness of 5μ. When the positive hole-moving layer-forming solution was coated on the carrier-generating layer, since the movable carrier-generating layer was dissolved by tetrahydrofuran of the positive hole-moving layer-forming solution, blade streaks were formed and the coating became uneven because of dissolution of the movable carrier-generating layer. Accordingly, the obtained photosensitive plate for electrophotography was uneven as a whole. When the charging characteristics of this photosensitive plate were determined according to the same method as described in Example 1, it was found that the maximum surface potential was −530 V and the half-value exposure quantity was 12 lux-sec. When the photosensitive plate was subjected to corona discharge, imagewise exposure, development, transfer and fixation according to the known electrophotographic process, there was obtained only an image which was not faithful to an original but was uneven.

From the results of Example 1 and Comparative Example 1, it will readily be understood that when a binder which is not dissolved by the solvent of the positive hole-moving layer-forming solution is used for the movable carrier-generating layer, sensitization can be accomplished at a much higher efficiency than when a binder which is dissolved by the above solvent is used, and a laminated photosensitive plate for electrophotography having a great practical utility can be obtained.

EXAMPLE 2

In 60 g of methylene chloride were dissolved 1 g of a polyvinylpyrrolidone resin (PVP K-90 manufactured and supplied by GAF Co.) and 1 g of 2,4,7-trinitrofluorenone, and 1 g of a β-type metal-free phthalocyanine pigment (Heliogen Blue 7800 manufactured and supplied by BASF, C.I. 74100) was added to the solution and the mixture was dispersed for 2 minutes by an ultrasonic disperser. This dispersion was coated on anodically oxidized aluminum sheet having a thickness of 80μ by a wire doctor blade and dried at 100° C. for 2 minutes to form a movable carrier-generating layer having a thickness of 6μ.

A positive hole-moving layer-forming solution prepared by dissolving 10 g of polyvinylcarbazole (Luvican M-170 manufactured and supplied by BASF) and 1 g of a polyester resin (Adhesive 4900 manufactured and supplied by Du Pont) in 160 g of tetrahydrofuran was coated on the movable carrier-generating layer by a wire doctor blade and dried at 100° C. for 30 minutes. When the positive hole-moving layer-forming solution was coated on the movable carrier-forming layer, the movable carrier-generating layer was not dissolved by tetrahydrofuran of the positive hole-moving layer-forming solution, and therefore, a uniform laminated photosensitive plate for electrophotography was obtained. The photosensitive plate was rich in the flexibility, and crazing or curling was hardly caused.

When the charging characteristics of the photosensitive plate were determined according to the method described in Example 1, it was found that the maximum surface potential was −450 V and the half-value exposure quantity was 15 lux-sec. When the photosensitive plate was subjected to corona discharge, imagewise exposure, development, transfer and fixation according to the known electrophotographic process, there was obtained an image faithful to an original, in which the background was not contaminated at all.

COMPARATIVE EXAMPLE 2

For comparison, 1 g of a polyester resin (Adhesive 49000 manufactured and supplied by Du Pont) and 1 g of 2,4,7-trinitrofluorenone were dissolved in 30 g of tetrahydrofuran, and 1 g of a β-type metal-free phthalocyanine pigment (Heliogen Blue 7800 manufactured and supplied by BASF, C.I. 74100) was added to the solution and the mixture was dispersed for 2 minutes by an ultrasonic disperser. The dispersion was coated on an anodically oxidized aluminum sheet having a thickness of 80μ by a wire doctor blade and dried at 100° C. for 2 minutes to form a movable carrier-generating layer having a thickness of 7μ. Then, the same positive hole-moving layer-forming solution as used in Example 2 was coated on the so formed layer by a wire doctor blade and dried at 100° C. for 30 minutes to form a positive hole-moving layer having a thickness of 5μ. Since the movable carrier-generating layer was dissolved by tetrahydrofuran of the positive hole-moving layer-forming solution at the coating step, blade streaks were formed and the coating became uneven. Accordingly, the obtained photosensitive plate for electrophotography was uneven as a whole. When the charging characteristics of the photosensitive plate were determined according to the method described in Example 1, it was found that the maximum surface potential was −300 V and the half-value exposure quantity was 14 lux·sec. When the photosensitive plate was subjected to corona discharge, imagewise exposure, development, transfer and fixation, there was obtained only an image which was not faithful to an original but was uneven.

From the results of Example 2 and Comparative Example 2, it will readily be understood that when a binder which is not dissolved by the solvent of the positive hole-moving layer-forming solution is used for the movable carrier-generating layer, a laminated photosensitive plate for electrophotography having a high practical utility can be obtained without reduction of the maximum surface potential, and this photosensitive plate is excellent over a comparative photosensitive plate prepared by using a binder, which is dissolved by the above solvent, for the movable carrier-generating layer.

EXAMPLE 3

In 70 g of methylene chloride were dissolved 1.5 g of a polyvinylpyrrolidone resin (PVP K-90 manufactured and supplied by GAF Co.) and 1.0 g of 2,5-dichloro-p-benzoquinone, and 1 g of a perinone pigment (Hostaperm Orange GR manufactured and supplied by Hoechst AG, C.I. 71105) was added to the solution and the mixture was dispersed for 2 minutes by an ultrasonic disperser. The dispersion was coated on a rigid aluminum sheet having a thickness of 50μ by a wire doctor blade and dried at 100° C. for 2 minutes to form a movable carrier-generating layer having a thickness of 7μ.

A positive hole-moving layer-forming solution prepared by dissolving 10 g of polyvinylcarbazole (Luvican M-170 manufactured and supplied by BASF) in 150 g of tetrahydrofuran was coated on the movable carrier-forming layer by a wire doctor blade and dried at 100° C. for 30 minutes to form a positive hole-moving layer having a thickness of 3μ. At this coating step, the movable carrier-generating layer was not dissolved by tetrahydrofuran of the positive hole-moving layer-forming solution, and therefore, a uniform laminated photosensitive plate for electrophotography was obtained. The photosensitive plate was rich in the flexibility and toughness, and crazing or curling was hardly caused.

When the charging characteristics of the photosensitive plate were determined according to the method described in Example 1, it was found that the maximum surface potential was −380 V and the half-value exposure quantity was 80 lux·sec.

COMPARATIVE EXAMPLE 3

For comparison, 4 g of an acrylic resin (LR-018 manufactured and supplied by Mitsubishi Rayon; solid content=40%) and 1 g of 2,5-dichloro-p-benzoquinone were dissolved in 30 g of toluene, and 1 g of a perinone pigment (Hostaperm Orange GR manufactured and supplied by Hoechst AG, C.I. 71105) was added to the solution and the mixture was dispersed for 2 minutes by an ultrasonic disperser. The dispersion was coated on a rigid aluminum sheet having a thickness of 50μ by a wire doctor blade and dried at 100° C. for 2 minutes to form a movable carrier-generating layer having a thickness of 7μ. The same positive hole-moving layer-forming solution as used in Example 3 was coated on the so formed layer by a wire doctor blade and dried at 100° C. for 30 minutes to form a positive hole-moving layer having a thickness of 4μ. At the coating step, the movable carrier-generating layer was dissolved by tetrahydrofuran of the positive hole-moving layer-forming solution, and blade streaks were formed and the coating became uneven by this dissolution. Therefore, the obtained laminated photosensitive plate was uneven as a whole. When the charging characteristics of the photosensitive plate were determined according to the method described in Example 1, it was found that the maximum surface potential was −410 V and the half-value exposure quantity was 85 lux·sec.

EXAMPLE 4

In 70 g of chloroform were dissolved 1.5 g of a polyvinylpyrrolidone resin (PVP K-90 manufactured and supplied by GAF Co.) and 2 g of 2,3-dichloro-1,4-naphthoquinone, and 1 g of a β-type metal-free phthalocyanine pigment (Heliogen Blue 7800 manufactured and supplied by BASF, C.I. 74100) was added to the solution and the mixture was dispersed for 2 minutes by an ultrasonic disperser. The dispersion was coated on a rigid aluminum sheet having a thickness of 50μ by a wire doctor blade and dried at 100° C. for 2 minutes to form a movable carrier-generating layer having a thickness of 8μ.

A positive hole-moving layer-forming solution prepared by dissolving 10 g of polyvinylcarbazole (Luvican M-170 manufactured and supplied by BASF) in 160 g of monochlorobenzene was coated on the movable carrier-generating layer by a wire doctor blade and dried at 100° C. for 30 minutes to form a positive hole-moving layer having a thickness of 5μ. At this coating step, the movable carrier-generating layer was not dissolved by monochlorobenzene of the positive hole-moving layer-forming solution, and therefore, a uniform laminated photosensitive plate for electrophotography was obtained. The so obtained was rich in the flexibility and toughness, and crazing or curling was hardly caused.

When the charging characteristics of the photosensitive plate were determined according to the method described in Example 1, it was found that the maximum surface potential was −480 V and the half-value exposure quantity was 24 lux·sec. When the photosensitive plate was subjected to corona discharge, imagewise exposure, development, transfer and fixation according to the known electrophotographic process, an image faithful to an original was obtained without contamination of the background.

COMPARATIVE EXAMPLE 4

In 50 g of methylene chloride were dissolved 1.5 g of a polycarbonate resin (Panlite L manufactured and supplied by Teijin Limited) and 2 g of 2,3-dichloro-1,4-naphthoquinone, and 1 g of a β-type metal-free phthalocyanine pigment (Heliogen Blue 7800 manufactured and supplied by BASF, C.I. 74100) was added to the solution and the mixture was dispersed for 2 minutes by an ultrasonic disperser. The dispersion was coated on a rigid aluminum sheet having a thickness of 50μ by a wire doctor blade and dried at 100° C. for 2 minutes to form a movable carrier-generating layer. The same positive hole-moving layer-forming solution as used in Example 4 was coated on the movable carrier-generating layer by a wire doctor blade and dried at 100° C. for 30 minutes to form a positive hole-moving layer. At the coating step, the movable carrier-generating layer was dissolved by monochlorobenzene of the positive hole-moving layer-forming solution and therefore, blade streaks were formed and the coating became uneven because of dissolution of the movable carrier-generating layer. Accordingly, the obtained laminated photosensitive plate for electrophotography was uneven as a whole. When the charging characteristics of the photosensitive plate were determined according to the method described in Example 1, it was found that the maximum surface potential was −330 V and the half-value exposure quantity was 30 lux·sec. When the photosensitive plate was subjected to corona discharge, imagewise exposure, development, transfer and fixation according to the known electrophotographic process, only an uneven image, which was not faithful to an orignal, was obtained.

From the results of Example 4 and Comparative Example 4, it was found that when a binder which is not dissolved by the solvent of the positive hole-moving layer-forming solution is used for the movable carrier-generating layer, sensitization can be accomplished at a much higher efficiency than when a binder which is dissolved by the above solvent is used for the movable carrier-generating layer, and a laminated photosensitive plate for electrophotography having a high practical utility can be obtained without reduction of the maximum surface potential.

What is claimed is:

1. A process for the preparation of laminated photosensitive plates for electrophotography, which comprises coating on a conductive substrate a coating composition formed by dissolving a vinyl pyrrolidone type polymer and an electron-receptive substance in a halogenated aliphatic hydrocarbon solvent and dispersing a photoconductive organic pigment in the solution, drying the coated composition to form a layer comprised of a matrix comprising the vinyl pyrrolidone type polymer and the electron-receptive substance and the photoconductive organic pigment dispersed in the matrix, coating on the so-formed layer a solution of polymer of N-vinyl carbazole or a derivative thereof an electron-donative polymer in a solvent selected from the group consisting of cyclic ethers, halogenated aromatic hydrocarbons and aromatic hydrocarbon/ketone mixed solvents, and drying the coated solution to form a layer of the electron-donative polymer.

2. The process of claim 1 wherein said matrix comprises one part by weight of the photoconductive organic pigment, 0.2 to 5 parts by weight of the vinyl pyrrolidone type polymer and 0.5 to 4 parts by weight of the electron-receptive substance.

3. The process of claim 1 wherein the electron-receptive substance is soluble in the solvent for the electron-donative polymer and wherein a charge-transferring complex of the electron-donative polymer and the electron-receptive substance is formed in the boundary region between the layer comprised of the matrix and the layer of the electron-donative polymer, said vinyl pyrrolidone type polymer being insoluble in the solvent for the electron-donative polymer such that there is no mutual dissolution or mingling of the electron-donative polymer and the vinyl pyrrolidone type polymer in said boundary region.

4. The process of claim 2 wherein said vinyl pyrrolidone type polymer is a homopolymer of vinyl pyrrolidone or a copolymer of vinyl pyrrolidone in which vinyl pyrrolidone units occupy at least 60 mole% of the total monomer units of the copolymer, said vinyl pyrrolidone type polymer having an average molecular weight, as determined according to the ismotic pressure method, in the range from 150,000 to 500,000, said vinyl pyrrolidone type polymer being soluble in halogenated hydrocarbon solvents but substantially insoluble in the solvent for the electron-donative polymer.

5. The process of claim 4 wherein the photoconductive organic pigment is at least one member selected from the group consisting of phthalocyanine pigments, bis-benzoimidazole pigments, indigo pigments, azo pigments, perylene pigments and quinacridone pigments and said electron-receptive substance is an organic compound soluble in halogenated aliphatic hydrocarbons and selected from the group consisting of 2,4,7-trinitro-9-fluorenone, chloranil, 2,3-dichloro-1,4-naphthoquinone, 2,5-dichloro-p-benzoquinone, 1,5-dichloroanthraquinone and tetracyanoquinodimethane.

* * * * *